Patented Dec. 3, 1946

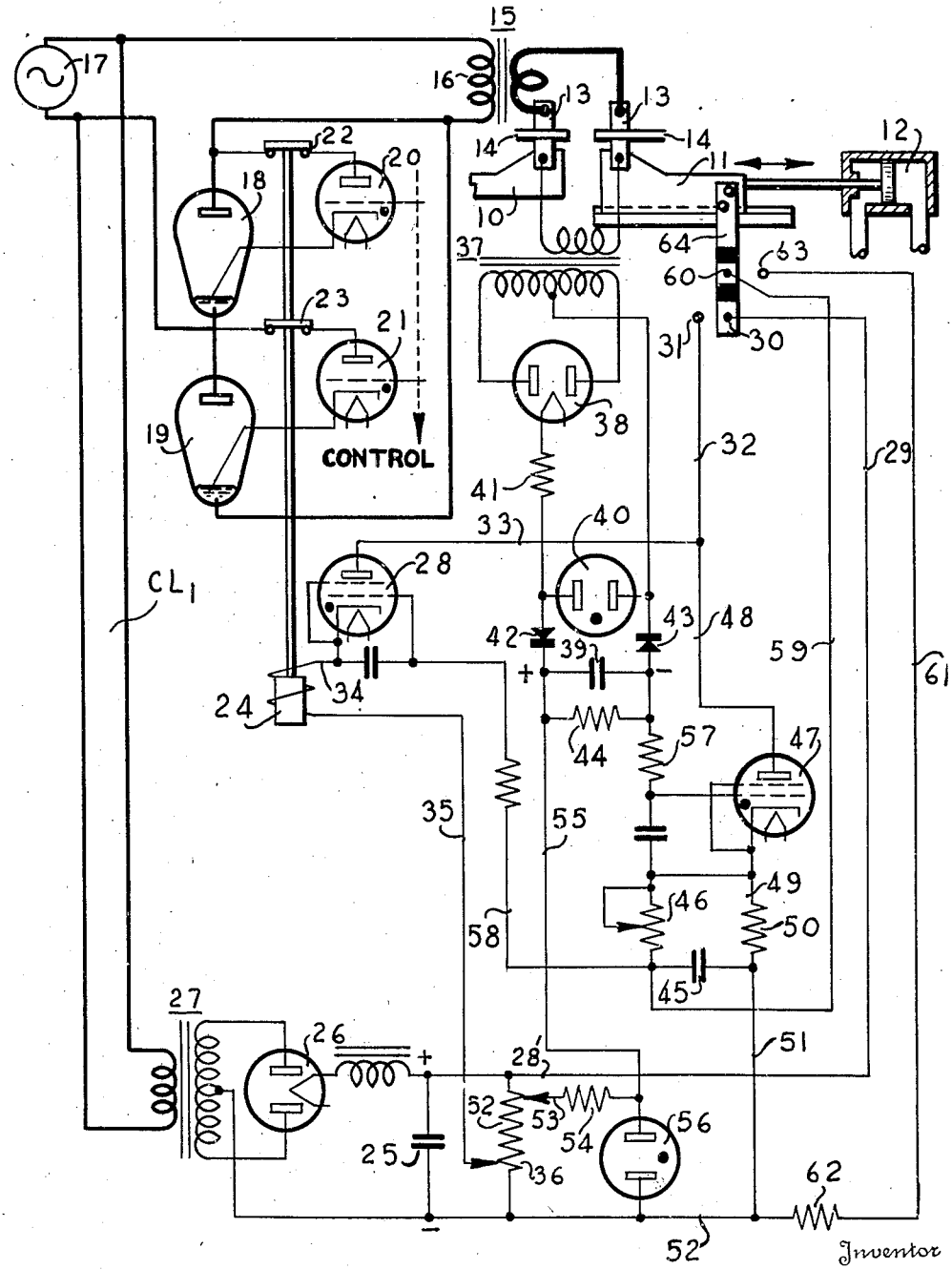

2,412,067

UNITED STATES PATENT OFFICE 2,412,067

CONTROL OF FLASH WELDING

Clyde E. Smith, Warren, Ohio, assignor to The Taylor-Winfield Corporation, Warren, Ohio, a corporation of Ohio Application May 19, 1944, Serial No. 536,338

12 Claims. (Cl. 219—4)

This invention relates to electric flash welding and more particularly to methods and means for controlling the flow of current to the work pieces. As generally practiced, the electric flash welding method comprises the clamping of the pieces to be welded together in relatively movable platens having means whereby the same may be moved toward each other in an accurately controllable manner and the controlled application of current to the work pieces held in the platens. At the start of a cycle of operation the work pieces may be moved into engagement with each other and current of predetermined magnitude passed through the pieces for preheating the same after which they are moved apart and flashing initiated across the cleft separating the pieces. As the flashing progresses the work pieces are gradually moved toward each other and at a time when the opposite edges of the pieces are sufficiently heated and otherwise conditioned to effect a proper weld the pieces are rapidly brought together with sufficient force to effect a proper forging action necessitating displacement or upsetting of the material of the pieces contiguous to the meeting edges in varying degree. In welding certain materials, such as low carbon steel for example, the flow of current may be entirely discontinued upon completion of the flashing period and, also, in certain operations the preheating step may be eliminated without deleterious results. In the welding of the high carbon or alloy steels or of pieces generally having large cross-sectional areas, however, it is normally desirable to continue the application of current beyond the point of upset since the actual welding takes place during the upsetting period and it is necessary to maintain the weld metal in a state of proper welding plasticity to insure the homogenous and complete progression of the weld.

The closing of the gap between the work pieces at the instant of upset greatly reduces the resistance of the welding transformer secondary circuit, as will be readily understood, resulting in substantial increase in the value of the welding current. In the avoidance of any hiatus in the heating of the metal contiguous to the cleft at the time of upset which is a highly desirable operating condition it is, of course, necessary that such current be of considerable magnitude. Consequently it becomes necessary to control the total time of application of such current since otherwise overheating and excessive oxidation of the weld may result. The effects of this overheating may result in excessive and non-uniform upsetting and in the reduction of the resistive or reactionary force to such a low value that a proper weld cannot be made.

The primary object of the present invention therefore is the provision of a flash welding method in which the total quantity of electrical energy applied to the work pieces during the upset period of the welding cycle is controlled.

Another object of the invention is the provision of an improved flash welding method in which the length of time of application of the heating current applied to the work pieces during the upsetting period of the flash welding cycle is accurately predetermined and controlled.

A more specific object of the invention is the provision of an improved apparatus for electric flash welding in which the length of time of application of the heating current applied to the work pieces during the upsetting period of the flash welding cycle is accurately predetermined and controlled and in which the timing period always begins at a predetermined time relative to the instant of effective interengagement of the work pieces at the start of the upsetting period irrespective of variations or changes made in conditions as regards preheating and amount or speed of flashing. This object is accomplished, in accordance with the principles of the invention, by the provision of means which initiates operation of the timing device or circuit employed in predetermined time relation with respect to the change in transient electrical conditions as occur in the welding circuit at the time of effective interengagement of the work pieces at the start of the upset period. In this manner a highly accurate and consistent control may be had of the total heating energy furnished the work pieces during the upset period.

The above and other objects and advantages of the invention will become apparent upon consideration of the following detailed specification and the accompanying drawing wherein there is specifically disclosed a preferred embodiment of the invention.

The single figure of the drawing is a schematic representation of an electric flash welding system constructed in accordance with the principles of the invention and wherein the reference numerals 10 and 11 represent the conventional fixed and movable platens, respectively, of a flash welding machine. Suitable means, such as the hydraulic cylinder 12 for example, is connected to the platen 11 to effect movement thereof in a direction either toward or away from the fixed platen 10. In accordance with usual practice, platens 10 and 11 are each provided with current conductive clamps 13 for grasping and conducting welding current to the work pieces 14. The current conductive portions of clamp 13 are connected to the end terminals of the secondary of a welding transformer 15.

Transformer 15 is provided with a primary winding 16 which may be energized from an alternating current source 17 through a pair of reversely connected valves 18 and 19, preferably of the ignitron type. Associated with the valve 18 is a controlled starting or firing tube 20, preferably of the thyratron type, and a similar tube 21 is provided for the valve 19. As shown, a normally closed contactor 22 is placed in the anode circuit of the tube 20 and a similar contactor 23 is positioned in the anode circuit of the tube 21. Contactors 22 and 23 are arranged to be simultaneously actuated or opened by a solenoid 24. It should be understood that upon energization of the solenoid 24 the contactors 22 and 23 will be opened and the valves 18 and 19 will consequently be maintained non-conducting. Tubes 20 and 21 are each provided with a control element; and suitable circuit means, not a part of the present invention and not shown herein, is normally provided to control the potentials applied to these control elements in such manner as to effect proper strength of flashing current and other conditions required for the initiation and completion of the flash welding cycle.

I provide a capacitance 25 arranged to be maintained in predetermined charged condition by the full wave rectifier 26 which derives its energy from source 17 through the line conductor CL1 and the transformer 27. Solenoid 24 is adapted to be energized by the flow of current resulting from the discharge of capacitance 25 through a tube 28, preferably of the grid-controlled gaseous discharge type, and the energizing circuit for solenoid 24 may be traced from the positive terminal of capacitance 25 through conductors 28, 29, switch contacts 30 and 31, conductor 32, conductor 33, anode-cathode of tube 28, conductor 34, coil 24, conductor 35, and resistance 36 to the negative terminal of capacitance 25. A control circuit now to be described is provided to render tube 28 conducting a predetermined time interval after the interengagement of the work pieces 14 at the start of the upsetting period.

Having its primary winding connected to the clamps 13 is a "step-up" transformer 37 the output of the secondary of which is rectified by means of a full wave rectifier 38 and subsequently utilized to maintain a predetermined charge on a capacitance 39. A voltage regulating tube 40 is connected across the capacitance 39 to limit the voltage impressed on the capacitance to a predetermined fixed value. A current limiting resistor 41 is placed in the conductor leading from the cathode of rectifier 38 and rectifiers 42 and 43, preferably of the dry disk type, are inserted in the leads connecting opposite electrodes of the tube 40 with opposite terminals of the capacitance 39 to prevent the charge on capacitance 39 from being dissipated back through tube 40 during periods of decreased output of the rectifier 38. For a purpose to be later described a resistance 44 of comparatively small value is connected across the capacitance 39.

I provide a timing circuit consisting primarily of a capacitance 45 and a potentiometer 46 which is operative upon the capacitance attaining a predetermined charge to initiate conduction in tube 28. Operation of the timing circuit is initiated by the start of conduction in an electric discharge device 47, also preferably of the grid-controlled gaseous type, conduction in tube 47 causing the flow of current in a circuit which may be traced from positive terminal of capacitance 25 through conductors 28 and 29, switch 30, 31, conductors 32 and 48, anode-cathode of tube 47, conductor 49, resistance 50, and conductors 51 and 52 to the negative terminal of capacitance 25. The potential developed across resistance 50 is utilized to charge capacitance 45 at a rate determined by the setting of potentiometer 46. In series with the resistance 36 across the capacitance 25 is a resistance 52 having an adjustable tap 53 connected through resistance 54 and conductor 55 with the positive end of the resistance 44. Connected across the conductor 55 and the negative terminal of capacitance 25 is a voltage regulating tube 56 for the purpose of supplying a fixed reference voltage to the grid control circuit of tube 47 in the manner now to be described. Such grid control circuit may be traced from the cathode of tube 47 through conductor 49, resistance 50, conductors 51 and 52, tube 56, conductor 55, resistance 44, and grid resistor 57 to the control grid of tube 47. The voltage limiting characteristics of the tubes 40 and 56 are so selected that normally a higher potential difference is maintained across resistance 44 than across the tube 56. Since the former is negative while the latter is positive with respect to the grid the tube 47 will be held non-conducting. The value of resistance 44 is so related to the value of capacitance 39 that within a predetermined short interval of time following a predetermined drop in the output of rectifier 38 the potential across resistance 44 will drop down to the value of the potential across tube 56 thus removing the negative bias of the tube 47 and permitting it to conduct. In a representative commercial embodiment of the invention this time constant has been found to be fairly uniform at eight milliseconds.

The control circuit for the tube 28 may be traced from the cathode thereof through conductor 34, coil 24, conductor 35, resistance 36, conductors 52 and 51, capacitance 45, and conductor 58 to the control grid of tube 28. Prior to conduction in tube 47 and therefore prior to the appearance of any potential across capacitance 45 the negative bias furnished by resistance 36 is sufficient to hold tube 28 non-conducting. However, upon the capacitance 45 attaining a predetermined potential in opposition to the negative potential applied by the resistance 36 the tube 28 will begin to conduct as will be understood. Thus the time interval between the initiation of conduction in the tube 47 which may be considered the "start" tube and the initiation of conduction in the tube 28 which may be considered the "stop" tube may be accurately predetermined and adjusted by varying the setting of the potentiometer 46. To discharge capacitance 45 in preparation for the next succeeding cycle of operation I provide a circuit comprising a conductor 59 interconnecting one terminal of the capacitance and a switch contact 60 and a second conductor 61 having a current limiting resistor 62 interposed therein interconnecting the other terminal of the capacitance through conductor 51 with the switch contact 63. Switch contacts 300 and 60 are insulated from each other and from an arm 64 on which they are mounted. As shown, arm 64 is rigidly connected to and moves along with the slideable platen 11 while the switch contacts 31 and 63 are normally fixed with respect to the fixed platen 10 of the welding machine.

Switch contacts 30 and 31 are so relatively positioned that one contacts the other only after the platen 11 has progressed sufficiently to burn off some of the edges of the work pieces during the flashing period. Thus the switch 30, 31 constitutes, in effect, an interlock which prevents operation of the timing circuit and the subsequent energization of solenoid 24 until after the start of the flashing period. This mode of operation avoids the operation of the timing and current interrupting circuits when the work pieces are initially brought together at the start of the welding cycle to preheat the edges of the work pieces which, as explained above, may be highly desirable in certain instances. It should be understood, however, that, within the purview of the invention, various other specific means may be employed to delay the initiation of the timing circuit until after the start of the flashing period. For example, I may provide a relay in control of the flow of current to the timing "start" tube having a photoelectric element which is responsive to the light emitted by the arcing or flashing between the work pieces. Switch contacts 60 and 63 interengage upon the platen 11 being retracted following the completion of a cycle of operation. Upon the closure of switch 60, 63 the potential across capacitance 45 will be entirely dissipated through resistance 62 and the capacitance 45 will remain discharged until switch 30, 31 is again closed and the tube 47 again rendered conducting in the next succeeding cycle of operation. It should be understood that switch 30, 31 when once closed will be held closed until the completion of the welding cycle and retraction of the platen 11.

In operation, rectifier 26 maintains a predetermined charge on the capacitance 25 while at the start of a cycle of operation and continuing during the preheating period, if used, no charge will appear on the capacitance 45. However, capacitance 39 will commence to charge immediately upon the application of current to the work pieces although during the preheating period the voltage attained, if any, will be quite low due to the short-circuiting of the work pieces. When the pieces are moved apart and flashing initiated the output of rectifier 38 will rise precipitously to rapidly charge capacitance 39 to a voltage determined by the characteristic of the tube 40. As this voltage is subsequently higher than the voltage across tube 56 the tube 47 will not conduct upon closure of switch 30, 31. These conditions prevail during normal flashing, the capacitance 39 absorbing any momentary variations in the output of the rectifier 38, but as the work pieces are jammed together at the beginning of upset the output of rectifier 38 diminishes precipitously and to a potential value far below the potential across tube 56. The excess charge on capacitance 39 is then dissipated at a rate determined by the value of resistance 44 and upon the charge approaching a value commensurate with the potential drop across tube 56 tube 47 will begin to conduct as explained above to initiate operation of the timing circuit. It should be understood that since the excess charge on capacitance 39 is dissipated at a predetermined rate the time intervals between the instants of interengagement of the work pieces and conduction in tube 47 are uniform in succeeding cycles of operation and compensation for the same may, if desired, be made in the setting of the timing potentiometer 46. As explained above, this uniform delay is sufficiently short so as not to interfere with a wide range of adjustment of the timing circuit including the ability thereof to time out very short intervals.

The above specifically described embodiment of the invention should be considered as illustrative only as obviously many changes may be made therein without departing from the spirit or scope of the invention. I consider any arrangement for initiating operation of the particular timing means or circuit employed at a time substantially coincident with the beginning of upset as coming within the purview of the invention. Thus I may employ a current transformer having its primary in the welding current supply circuit and utilize the increase in the output of such transformer as results from the increased welding current flow at the start of upset to initiate operation of the timing means.

Reference should therefore be had to the appended claims in determining the scope of the invention.

What I claim is:

1. In electric flash welding apparatus having relatively movable platens and a circuit to conduct current to work pieces held in said platens the combination of timing means, means to initiate operation of said timing means upon completion of the flashing period and substantially at the time of movement of said work pieces into engagement with each other at the start of upsetting of said pieces, and means controlled by said timing means to interrupt conduction in said circuit.

2. In electric flash welding apparatus having relatively movable platens and a circuit to conduct current to work pieces held in said platens the combination of timing means, means responsive to the voltage appearing across the cleft between said work pieces to initiate operation of said timing means upon completion of the flashing period and substantially at the time of movement of said work pieces into engagement with each other at the start of upsetting of said pieces, and means controlled by said timing means to interrupt conduction of said circuit.

3. In electric flash welding apparatus having relatively movable platens and a circuit to conduct current to the work pieces held in said platens the combination of a timing means, means responsive to the voltage appearing across the cleft between said work pieces and operative to initiate operation of said timing means upon completion of the flashing period and substantially at the time of movement of said work pieces into engagement with each other at the start of upsetting of said pieces, means to render said voltage responsive means inoperative except upon completion of the flashing, and means controlled by said timing means to interrupt conduction in said circuit.

4. In electric flash welding apparatus having relatively movable platens and a circuit to conduct current to the work pieces held in said platens the combination of control means in said circuit in control of the current supplied to said work pieces, means responsive to the voltage appearing across the cleft between said work pieces in control of said control means, and means to hold said voltage responsive means inoperative during a welding cycle at least until the start of the flashing period.

5. In electric flash welding apparatus having relatively movable platens and a circuit to conduct current to work pieces held in said platens as well as control means in said circuit in control of the flow of current to said work pieces comprising in combination means to maintain said control means in current conducting condition during the flashing and/or preheating phases of the welding cycle, and means responsive to an electrical condition in said circuit resulting from the solid contacting of said work pieces at time of upset to actuate said control means to interrupt the flow of current to said work pieces.

6. In electric flash welding apparatus having relatively movable platens and a circuit to conduct current to work pieces held in said platens, the combination of control means in said circuit in control of the flow of current to said work pieces, a transformer having its primary winding connected across said work pieces, means responsive to the output of said transformer in control of the operation of said control means, and means to hold said responsive means inoperative during the welding cycle at least until the start of the flashing period.

7. In electric flash welding apparatus having relatively movable platens and a circuit to conduct current to work pieces held in said platens the combination of control means in said circuit to control the flow of current to said work pieces, a transformer having its primary connected across said work pieces, timing means, means responsive to a predetermined diminution of the output of said transformer to initiate operation of said timing means, and means interconnecting said control means and said timing means whereby the former may be controlled in accordance with the operation of the latter.

8. Apparatus according to claim 7 further including means to prevent during the welding cycle the initiation of operation of said timing means until at least the beginning of the flashing period.

9. In electric flash welding apparatus having relatively movable platens and circuit controlling means to control the flow of current to work pieces held in said platens the combination of a timing circuit comprising a capacitance and means to change the charge on said capacitance, means responsive to a predetermined diminution of the voltage appearing across the cleft between said work pieces to initiate operation of said charge changing means, and means responsive to said capacitance attaining a predetermined changed voltage to interrupt conduction in said circuit controlling means.

10. In electric flash welding apparatus having relatively movable platens and a circuit for supplying current to work pieces held in said platens the combination of a timing circuit comprising a capacitance and means for changing the charge on said capacitance a predetermined amount in a predetermined period of time, means to initiate operation of said charge changing means during a welding cycle upon completion of the flashing period and substantially at the time of movement of said work pieces into engagement with each other at the start of upsetting of said pieces, and means operative upon said capacitance attaining said predetermined changed charge to interrupt conduction in said circuit.

11. In electric flash welding apparatus having relatively movable platens and a circuit for supplying current to work pieces held in said platens the combination of timing means, means to initiate operation of said timing means comprising a capacitance and a resistance connected in parallel, means responsive to the voltage appearing across the cleft between said work pieces to maintain a charge on said capacitance, a voltage limiting device connected across said capacitance, and means operative upon said timing means timing out its period to interrupt conduction in said circuit.

12. In electric flash welding apparatus having means to interrupt the flow of welding current, a timing device operative upon completion of its period to effect interruption of said current; and means to initiate operation of said timing device comprising an electric discharge device having a control member, a control circuit connected to said member and including in series a source of normally fixed positive biasing potential and a source of variable negative biasing potential comprising a resistance, a capacitance in parallel with said resistance, and rectifying means deriving energy from the potential existent across the cleft between the work pieces to maintain a predetermined charge on said capacitance.

CLYDE E. SMITH.